(12) United States Patent
Lee et al.

(10) Patent No.: US 7,159,078 B2
(45) Date of Patent: Jan. 2, 2007

(54) COMPUTER SYSTEM EMBEDDING SEQUENTIAL BUFFERS THEREIN FOR PERFORMING A DIGITAL SIGNAL PROCESSING DATA ACCESS OPERATION AND A METHOD THEREOF

(75) Inventors: Joong-Eon Lee, Sungnam-shi (KR); Kyoung-Mook Lim, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 354 days.

(21) Appl. No.: 10/762,170

(22) Filed: Jan. 21, 2004

(65) Prior Publication Data

US 2004/0162942 A1    Aug. 19, 2004

(30) Foreign Application Priority Data

Feb. 13, 2003    (KR) ...................... 10-2003-0009157

(51) Int. Cl.
*G06F 12/00* (2006.01)
(52) U.S. Cl. ..................................... 711/135
(58) Field of Classification Search ..................... None
See application file for complete search history.

(56) References Cited

U.S. PATENT DOCUMENTS

| | | | | |
|---|---|---|---|---|
| 4,942,553 | A  * | 7/1990 | Dalrymple et al. | 710/57 |
| 6,748,497 | B1 * | 6/2004 | Kang et al. | 711/137 |
| 6,912,638 | B1 * | 6/2005 | Hellman et al. | 711/167 |

* cited by examiner

*Primary Examiner*—Mano Padmanabhan
*Assistant Examiner*—Duc T Doan
(74) *Attorney, Agent, or Firm*—F. Chau & Associates, LLC

(57) ABSTRACT

A computer system embedding buffers therein for performing a digital signal processing (DSP) data access operation includes a DSP core, a data cache, first and second buffer modules, an external memory and a central processing unit (CPU) core. The CPU core executes instructions and the DSP core processes data in accordance with the instructions. The data cache stores temporary data associated with the DSP core. The first buffer module stores input data received by the DSP core while the second buffer module stores output data provided from the DSP core. The external memory stores the temporary data, the input data, and the output data, wherein the input and output data are received by and provided from the DSP core in series through the first and second buffer modules without going through the data cache.

14 Claims, 3 Drawing Sheets

COMPUTER SYSTEM EMBEDDING SEQUENTIAL BUFFERS THEREIN FOR PERFORMING A DIGITAL SIGNAL PROCESSING DATA ACCESS OPERATION AND A METHOD THEREOF

BACKGROUND OF THE INVENTION

1. Technical Field

The present invention relates to computer systems and, more specifically, to computer systems and methods thereof for improving the performance of a digital signal processing (DSP) data access operation.

2. Discussion of the Related Art

Recent trends in constructing computer systems are directed to designing the computer system-on-a-chip (SOC). In a SOC design, the computer system's components such as processors, cache memories, peripheral devices, and bus interface units are integrated on a single chip. Thus, the SOC may be regarded as a miniature computer system.

In a typical SOC design, the SOC may have two or more built-in processors such as: (1) a microprocessor (e.g., central processing unit (CPU)) to control the overall operations thereof; and (2) a coprocessor (e.g., digital signal processor (DSP)) to manage data processing operations. The DSP is further used to carry out data multiplication and accumulation, read and write operations for one or more memories, and operations for incrementing address pointer registers.

FIG. 1 illustrates several data processing features of a DSP in a SOC system. As shown in FIG. 1, a SOC 110 includes a CPU core 112, a DSP core 114, and a data cache 116. The CPU core 112 is a functional block or unit constructed by a preliminarily designed circuit pattern. The DSP core 114 accesses an external memory 120 by way of the data cache 116. The external memory 120 includes several storage fields (which are available to the DSP core 114), such as an input data field 122, a temporary data field 124, and an output data field 126. The input data field 122 stores data legible to the DSP core 114 and the output data field 126 stores data provided from the DSP core 114. The temporary data field 124 stores data to be read from/written to the DSP core 114. The data cache 116 is located between the DSP core 114 and the external memory 120, operates with a faster access time, and has a smaller memory capacity than the external memory 120. Data in the temporary, input, and output data fields 124, 122 and 126 is temporarily stored in the data cache 116 and then transferred to the DSP core 114 or the external memory 120.

The data stored in the data cache 116 is frequently accessed for the purpose of increasing a "hit ratio" of the data cache 116. However, as data in the input and output data fields 122 and 126 is stored in the data cache 116, the operational performance of the data cache 116 may degrade because it becomes difficult to access data therein more than once. In addition, because the temporary, input, and output data fields 124, 122, and 126 occupy a single restricted data address space accessible by the DSP core 114, the temporary data field 124 may become smaller if the input and output data fields 122 and 126 become extended due to an increase in the volume of data in each field 122 and 126. Thus, resulting in a degradation of DSP function when the DSP core 114 deals with a large amount of data.

Thus, there is a need for a computer system that does not have functional degradation of a DSP core and cooperates with data caches when there are large amounts of data processed by the DSP core.

SUMMARY OF THE INVENTION

According to an aspect of the present invention, a computer system is provided for improving the performance of a digital signal processing (DSP) data access operation and a method thereof that accesses input/output data from a DSP core serially without using a data cache and independently assigns the memory fields of data input, data output, and temporary data in an external memory.

According to an aspect of the present invention, there is provided a computer system including: a DSP core for processing data in accordance with an instruction; a data cache for storing temporary data associated with the DSP core; a first buffer module for storing input data received by the DSP core; a second buffer module for storing output data provided from the DSP core; and an external memory for storing the temporary data, the input data, and the output data.

The first and second buffer modules comprise: an address buffer for storing an address of the external memory; an increment unit for increasing the address by one bit; a buffer for storing either the input data or the output data; and a multiplexer for addressing the buffer in response to lower bits of the address. The address of the external memory is set by a central processing unit (CPU) core and the buffer is a data register.

The buffer comprises a valid bit that informs of a current occupation state by data therein. The external memory comprises a temporary data field, an input data field, and an output data field arranged therein. The computer system further comprises a CPU core that executes the instructions received by the DSP core. The computer system is further integrated on a chip, comprising the CPU core, the DSP core, the data cache, and the first and second buffer modules.

According to another aspect of the present invention, a method of accessing data in a computer system having a CPU core, a DSP core, a data cache, a buffer, and an external memory comprises the steps of: accessing temporary data for the external memory through the data cache if data of the DSP core includes the temporary data; executing a pre-fill operation to serially transfer input data to the buffer when the buffer is empty; executing a post-flush operation to store output data of the buffer in the external memory when the buffer is full; executing an auto-fill operation to stack the input data of the external memory in the buffer when the buffer is empty; and executing an auto-flush operation to store the output data of the buffer in the external memory when the buffer is full.

BRIEF DESCRIPTION OF THE DRAWINGS

The above features of the present invention will become more apparent by describing in detail exemplary embodiments thereof with reference to the attached drawings, in which.

DESCRIPTION OF EXEMPLARY EMBODIMENTS

Figure 2:
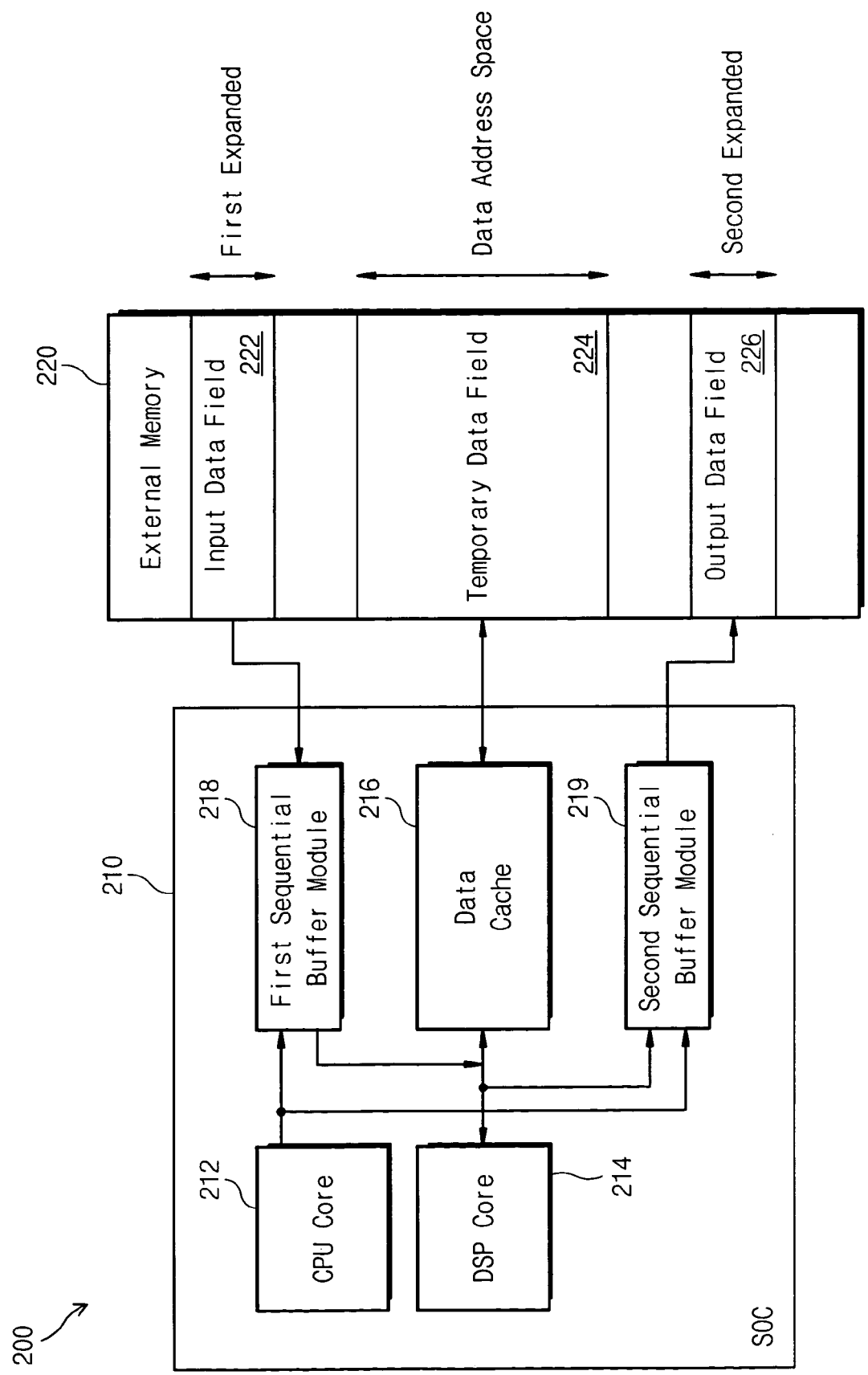
FIG. 2 is a block diagram illustrating a computer system operable with DSP, according to an exemplary embodiment of the present invention.

FIG. 2 shows a computer system 200 according to an exemplary embodiment of the present invention. The computer system 200 includes a system-on-a-chip (SOC) 210 and an external memory (and/or an off-chip memory) 220. The SOC 210 includes a central processing unit (CPU) core 212, a digital signal processing (DSP) core 214, a data cache 216, and first and second sequential buffers 218 and 219. The CPU core 212 receives a sequence of instructions from an instruction cache and decodes them to execute operations subject to the instructions. The sequence of instructions includes specific instructions such as PRE-FILL and POST-FLUSH to perform DSP operations in accordance with the present invention and additional instructions that enable the CPU core 212 to carry out additional operations.

The DSP core 214 is used in multimedia applications, in which input and output data is propagated in data stream patterns defined by the multimedia applications. Because a data stream with a specific pattern is to be read and stored once, it is typical for the data stream to be processed by the first and second sequential buffer modules 218 and 219. An example of data compression and extraction in a typical multimedia application technique involves the DSP core 214 performing data compression by fetching and encoding a source file to create a compression file. The DSP core 214 also creates an extraction file by fetching and decoding the compression file. In the DSP core 214, the source and compression files are regarded as onetime-used input files for the data compression or extraction and the compression and extraction files are regarded as onetime-used output files after completing the data compression and extraction. These onetime-used files of input or output data are transferred to/from the external memory 220 through the first and second sequential buffer modules 218 and 219.

Figure 1:
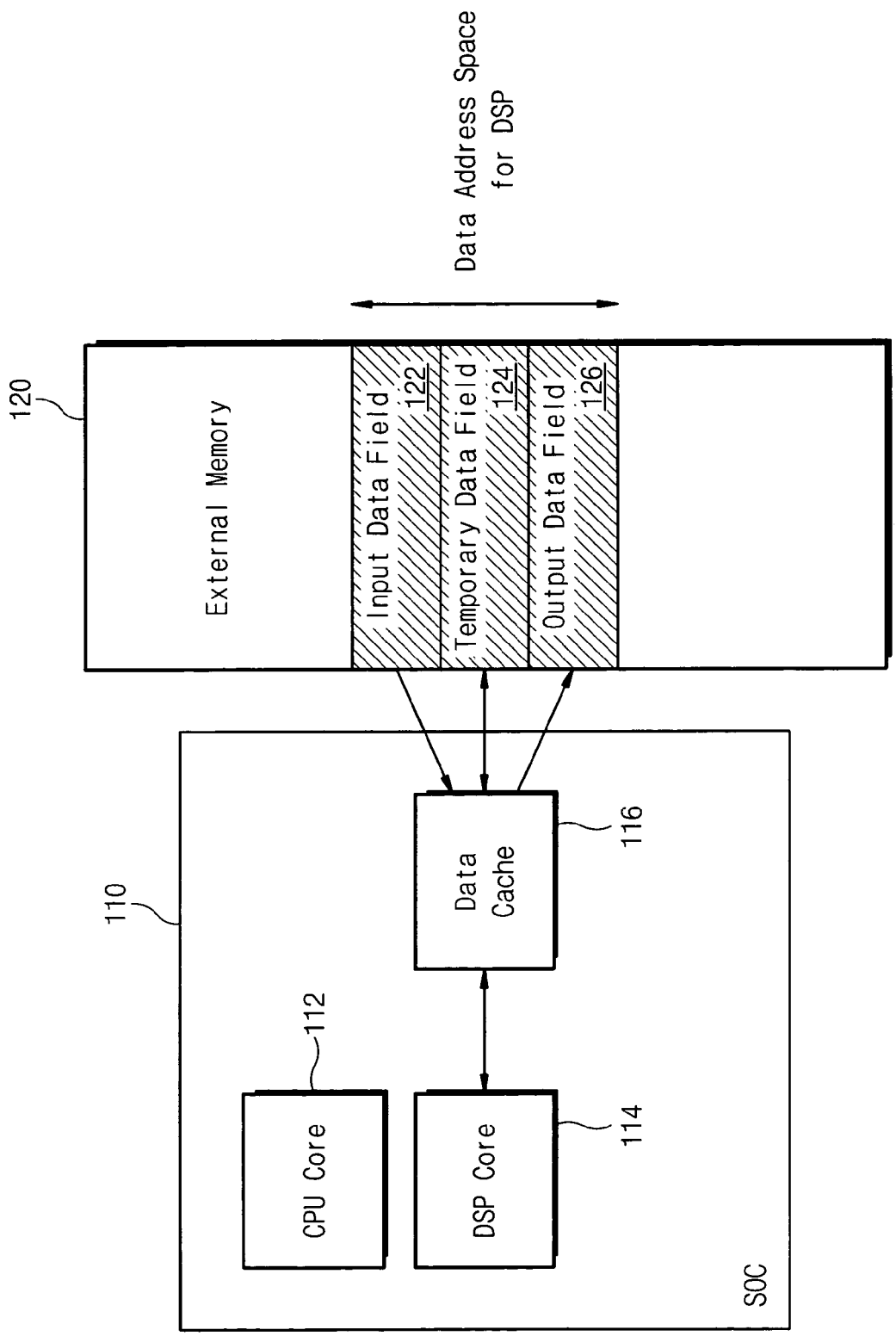
FIG. 1 is a block diagram illustrating a system-on-a-chip (SOC) operable with digital signal processing (DSP)

The external memory 220 includes separate and/or independent memory fields such as an input data field 222, a temporary data field 224, and an output data field 226. The temporary data field 224 corresponds to data addressing spaces similar to the temporary data field 124 shown in FIG. 1. The input and output data fields 222 and 226 are both assigned to expanded data addressing spaces. These assignments enhance the DSP functions of the system 200 because they allow more than one data addressing space, rather than providing a single data addressing space for the data files in the external memory 220 accessible by the DSP core 214.

Figure 3:
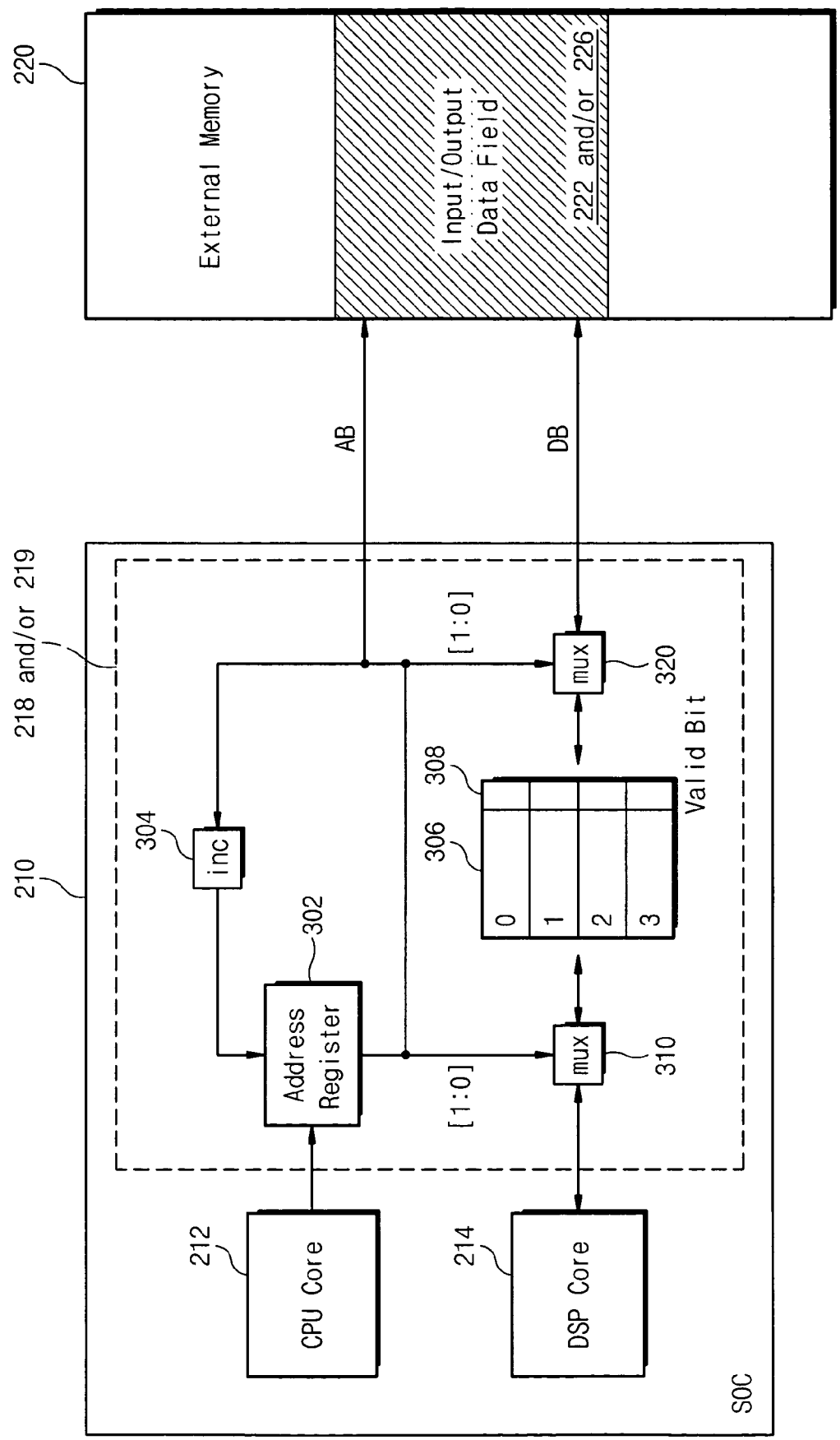
FIG. 3 is a block diagram illustrating a sequential buffer module of FIG. 2.

FIG. 3 shows the sequential buffer modules 218 and/or 219 of FIG. 2. Referring to FIG. 3, the sequential buffer modules 218 and/or 219 include an address register 302, an increment unit 304, a sequential buffer 306, and multiplexers 310 and 320. The address register 302 stores addresses for the external memory 220, which are set by the CPU core 212. The addresses are applied to the external memory 220 through an address bus AB to designate the input and output data fields therein. The increment unit 304 increments the external memory address by one bit to designate an internal address in the sequential buffer 306.

The sequential buffer 306, which is a register set that stores data, temporarily stores data transferred to the DSP core 214 from the external memory 220. While the sequential buffer may employ a multitude of data buffers, the sequential buffer 306 uses four data registers 0, 1, 2, and 3. The four data registers 0, 1, 2, and 3 are addressed by the lower two bits of the address stored in the address register 302. One of the data registers 0, 1, 2, and 3 stores a data word (e.g., data in the unit of word), including a single valid bit 308 for informing whether it is available for a corresponding register to read data therefrom or to write data thereto.

The single valid bit 308 is set to "1" when data is written to the corresponding data register of the sequential buffer 306, and goes to "0" when the written data is stored in the output data field 226 of the external memory 220. In addition, the valid bit 308 goes to "1" when data of the input data field 222 is changed in the data register of the sequential buffer 306 in response to a request from the DSP core 214, and to "0" when the data is read from the DSP core 214.

The multiplexer 310 transfers the data from the DSP core 214 to the data registers 0, 1, 2, and 3, which are addressed by the lower two bits of the address register 302. The multiplexer 320 transfers the data of the external memory 220 via a data bus DB to the data registers 0, 1, 2, and 3, which are addressed by the lower two bits of the address register 302.

Several operations in the computer system 200, associated with the sequential buffer modules 218 and 219, are as follows.

First, the system 200 determines whether one or all of the data registers 0, 1, 2, and 3 are empty or full, by using a logical combination of the valid bit 308 and an address value of the address register 302. Before beginning a read operation in the DSP core 214, operations subject to the instructions PRE-FILL and POST-FLUSH are carried out therein. The PRE-FILL operation serially reads data from the input data field 222 of the external memory 220, if the sequential buffer 306 is empty, and then stacks the data in the data registers 0, 1, 2, and 3 of the sequential buffer 306. The POST-FLUSH operation is enabled when the sequential buffer 306 is full, in which data written in the data registers 0, 1, 2, and 3 of the sequential buffer 306 is serially stored in the output data field 226.

Next, the read operation in the DSP core 214 performs an AUTO-FILL operation and an AUTO-FLUSH operation. The AUTO-FILL operation is conducted to stack data of the input data field 222 in the sequential buffer 306 when the sequential buffer 306 is empty due to data fetching by the DSP core 214. If the sequential buffer 306 is full of data provided from the DSP core 214, the AUTO-FLUSH operation is carried out to store the data of the sequential buffer 306 in the output data field 226 of the external memory 220.

In an alternative variant, the system may use several sequential buffer modules. In this variant, a sequential buffer module may manage input and output data one at a time. In addition, when there are more than two sequential buffer modules, the input and output data may be operable by at least two of the sequential buffer modules.

Although exemplary embodiments of the present invention have been disclosed for illustrative purposes, those skilled in the art will appreciate that various modifications, additions and substitutions are possible, without departing from the scope and spirit of the invention as described in the accompanying claims and their equivalents.

What is claimed is:

1. A computer system comprising:
   a central processing unit (CPU) core for executing instructions;
   a digital signal processing (DSP) core for processing data in accordance with the instructions;
   a data cache for storing temporary data associated with the DSP core;
   a first buffer module for storing input data received by the DSP core;

a second buffer module for storing output data provided from the DSP core; and an external memory for storing the temporary data, the input data, and the output data, wherein the input and output data are received by and provided from the DSP core in series through the first and second buffer modules without going through the data cache.

2. The computer system of claim 1, wherein the first and second buffer modules each comprise:

an address register for storing an address of the external memory;

an increment unit for increasing the address by one bit;

a buffer for storing either the input data or the output data; and a multiplexer for addressing the buffer in response to lower bits of the address.

3. The computer system of claim 2, wherein the address of the external memory is set by the (CPU) core.

4. The computer system of claim 2, wherein the buffer comprises a set of data registers.

5. The computer system of claim 2, wherein the buffer comprises valid bits that inform of current occupation state by data in the data registers.

6. The computer system of claim 1, wherein the external memory comprises a temporary data field, an input data field, and an output data field which are independently arranged therein.

7. The computer system of claim 2, wherein when the buffer is empty, the CPU core carries out a pre-fill operation to serially read the input data from the external memory and stack the input data in the buffer.

8. The computer system of claim 2, wherein when the buffer is full, the CPU core carries out a post-flush operation to store the output data of the buffer in the external memory.

9. The computer system of claim 2, wherein an auto-fill operation is carried out by the DSP core to stack the input data of the external memory in the buffer when the buffer is empty.

10. The computer system of claim 2, wherein if the buffer is full, the DSP core carries out an auto-flush operation to store the output data of the buffer in the external memory.

11. The computer system of claim 1, wherein the computer system is integrated on a chip, the chip comprising the CPU core, the DSP core, the data cache, and the first and second buffer modules.

12. A method of accessing data in a computer system having a central processing unit (CPU) core, a digital signal processing (DSP) core, a data cache, a buffer, and an external memory, comprising the steps of:

accessing temporary data for the external memory through the data cache if data of the DSP core includes the temporary data;

executing a pre-fill operation to serially transfer input data to the buffer when the buffer is empty;

executing a post-flush operation to store output data of the buffer in the external memory when the buffer is full;

executing an auto-fill operation to stack the input data of the external memory in the buffer when the buffer is empty; and executing an auto-flush operation to store the output data of the buffer in the external memory when the buffer is full, wherein the input and output data are accessed in series without passing through the data cache.

13. The computer system of claim 2, wherein the buffer of the first and second buffer modules is a sequential buffer.

14. The method of accessing data in a computer system of claim 12, wherein the auto-fill and the auto-flush operations are performed by the DSP core and the pre-fill and the post-flush operations are performed by the CPU core.

* * * * *